US010086681B1

(12) United States Patent
Hemphill et al.

(10) Patent No.: US 10,086,681 B1
(45) Date of Patent: Oct. 2, 2018

(54) MOON ROOF/SUNROOF WATER INTRUSION DIVERTER

(71) Applicant: FORD GLOBAL TECHNOLOGIES, LLC, Dearborn, MI (US)

(72) Inventors: Joshua Robert Hemphill, White Lake, MI (US); George Michalopoulos, Canton, MI (US); Spencer Monroe Dinkins, III, Rochester Hills, MI (US); Gregory James Grudzinski, Perrysburg, OH (US); Ronald M. Lovasz, Allen Park, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/454,592

(22) Filed: Mar. 9, 2017

(51) Int. Cl.
*B60J 7/043* (2006.01)
*B60J 7/00* (2006.01)

(52) U.S. Cl.
CPC ............. *B60J 7/0084* (2013.01); *B60J 7/043* (2013.01)

(58) Field of Classification Search
CPC .................................. B60J 7/22; B60J 7/0084
USPC .............. 296/213, 217, 216.06, 216.09, 218; 454/129
See application file for complete search history.

(56) References Cited

U.S. PATENT DOCUMENTS

| 2,173,890 | A | * | 9/1939 | Tuttle | B60H 1/262 296/215 |
| 2,190,462 | A | * | 2/1940 | Votypka | B60J 7/043 296/213 |
| 2,810,334 | A | * | 10/1957 | Perks | B60H 1/262 454/129 |
| 2,973,704 | A | * | 3/1961 | Flanagan | E04D 13/03 454/366 |
| 4,118,063 | A | * | 10/1978 | Bienert | B60J 7/1642 296/213 |
| 4,495,731 | A | * | 1/1985 | Sears | B60J 7/1642 296/218 |
| 4,892,351 | A |  | 1/1990 | Ono et al. |  |
| 4,936,622 | A |  | 6/1990 | Yamauchi et al. |  |
| 4,964,673 | A | * | 10/1990 | Lamparter | B60J 9/02 296/216.02 |
| 5,048,889 | A | * | 9/1991 | Hattass | B60J 7/0435 296/213 |
| 5,727,839 | A | * | 3/1998 | Ruhringer | B60J 7/04 296/213 |

(Continued)

FOREIGN PATENT DOCUMENTS

| DE | 4301635 C1 | 1/1994 |
| DE | 102004030613 A1 | 1/2006 |
| GB | 2206849 A | 1/1989 |

OTHER PUBLICATIONS

English Machine Translation of DE102004030613A1.
English Machine Translation of DE4301635C1.

*Primary Examiner* — Dennis H Pedder
(74) *Attorney, Agent, or Firm* — Jason Rogers; King & Schickli PLLC

(57) ABSTRACT

A device for preventing intrusion of collected water into a vehicle is provided, defined by a water diverter configured and dimensioned to divert water from at least a vehicle-rearward edge of a roof panel aperture provided for a vehicle sun roof/moon roof assembly. The water diverter further includes end portions configured and dimensioned to divert water from at least a portion of opposed vehicle-outboard edges of the roof panel aperture.

11 Claims, 4 Drawing Sheets

(56) References Cited

U.S. PATENT DOCUMENTS

| | | | | |
|---|---|---|---|---|
| 6,149,218 A | * | 11/2000 | Tremblay | B60P 3/36 |
| | | | | 296/210 |
| 6,592,177 B1 | * | 7/2003 | Mathew | B62D 25/06 |
| | | | | 296/102 |
| 6,641,210 B2 | | 11/2003 | Sommer et al. | |
| 7,866,739 B2 | | 1/2011 | Thiele | |
| 8,485,595 B2 | | 7/2013 | Maltaverne et al. | |
| 2016/0059680 A1 | | 3/2016 | Snider et al. | |

* cited by examiner

MOON ROOF/SUNROOF WATER INTRUSION DIVERTER

TECHNICAL FIELD

This disclosure relates generally to vehicle moon roofs/sunroofs. In particular, the disclosure relates to a water intrusion diverter for a vehicle moon roof/sunroof.

BACKGROUND

A vehicle roof panel often includes grooves or channels formed therein, which serve various purposes. These purposes may include such functions as serving as rain gutters, increasing strength/rigidity of the roof panel, improving vehicle aerodynamics, and reducing noise/vibration/harshness (NVH) during vehicle operation.

Such roof panel grooves or channels tend to accumulate water. This is of lesser concern in a vehicle having a roof panel not equipped with a sun roof/moonroof assembly. However, in vehicles equipped with a sun roof/moonroof assembly, the operator may not consider the possibility of accumulated water on the vehicle roof panel, and may simply open the sun roof/moonroof and drive off. On taking actions such as applying the vehicle brakes or driving on to a road defining a vehicle-forward decline, accumulated water may be channeled by inertia and/or gravity into the open sun roof/moonroof. This can potentially result in staining and damaging vehicle interior components such as upholstery, electronics, etc.

Accordingly, a need is identified in the art for structures to prevent such intrusion of water accumulated on a vehicle roof panel into an open sun roof/moonroof.

SUMMARY

In accordance with the purposes and benefits described herein, in one aspect of the present disclosure a device for preventing intrusion of collected water into a vehicle is provided, comprising a water diverter configured and dimensioned to divert water from at least a vehicle-rearward edge of a roof panel aperture provided for a vehicle sun roof/moon roof assembly. The water diverter may further include end portions configured and dimensioned to divert water from at least a portion of opposed vehicle-outboard edges of the roof panel aperture.

In embodiments, the water diverter includes a roof panel aperture-outboard facing water-diverting groove. In other embodiments, the water diverter further includes a roof panel aperture-inboard facing aerodynamic surface. The water diverter may be adapted for attaching to a portion of the vehicle roof panel adjacent to the roof panel aperture. Contemplated attachment methods include conventional fasteners, one or more of an adhesive, one or more push pins, one or more push-in rivets, one or more receivers adapted to engage an edge or a flange of the vehicle roof panel, and combinations thereof.

In other aspects, sun roof/moonroof assemblies and vehicles including the water diverter as described above are provided.

In the following description, there are shown and described embodiments of water diverters for a vehicle sun roof/moonroof assembly. As it should be realized, the devices are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of water diverters for a vehicle sun roof/moonroof assembly, and together with the description serve to explain certain principles thereof. In the drawings.

Reference will now be made in detail to embodiments of water diverters for a vehicle sun roof/moonroof assembly, examples of which are illustrated in the accompanying drawing figures. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

DETAILED DESCRIPTION

Preliminarily, certain elements herein are described according to their orientation relative to a vehicle 100, i.e. "vehicle-forward," "vehicle-rearward," "vehicle inboard," "vehicle-outboard," etc. As will be appreciated, these designations refer to the orientation of the elements relative to, respectively, a vehicle longitudinal or x-axis and a vehicle lateral or y-axis. So, as an example, an element described as oriented in a vehicle-forward orientation is facing vehicle-forwardly, i.e. facing towards the vehicle 100 nose along the vehicle x-axis. Other elements are described according to their orientation relative to other vehicle 100 features, such as "roof panel aperture-outboard facing" and "roof panel aperture-inboard facing." As will be appreciated, these designations refer to the orientation of the elements relative to the other vehicle 100 features.

Figure 1:
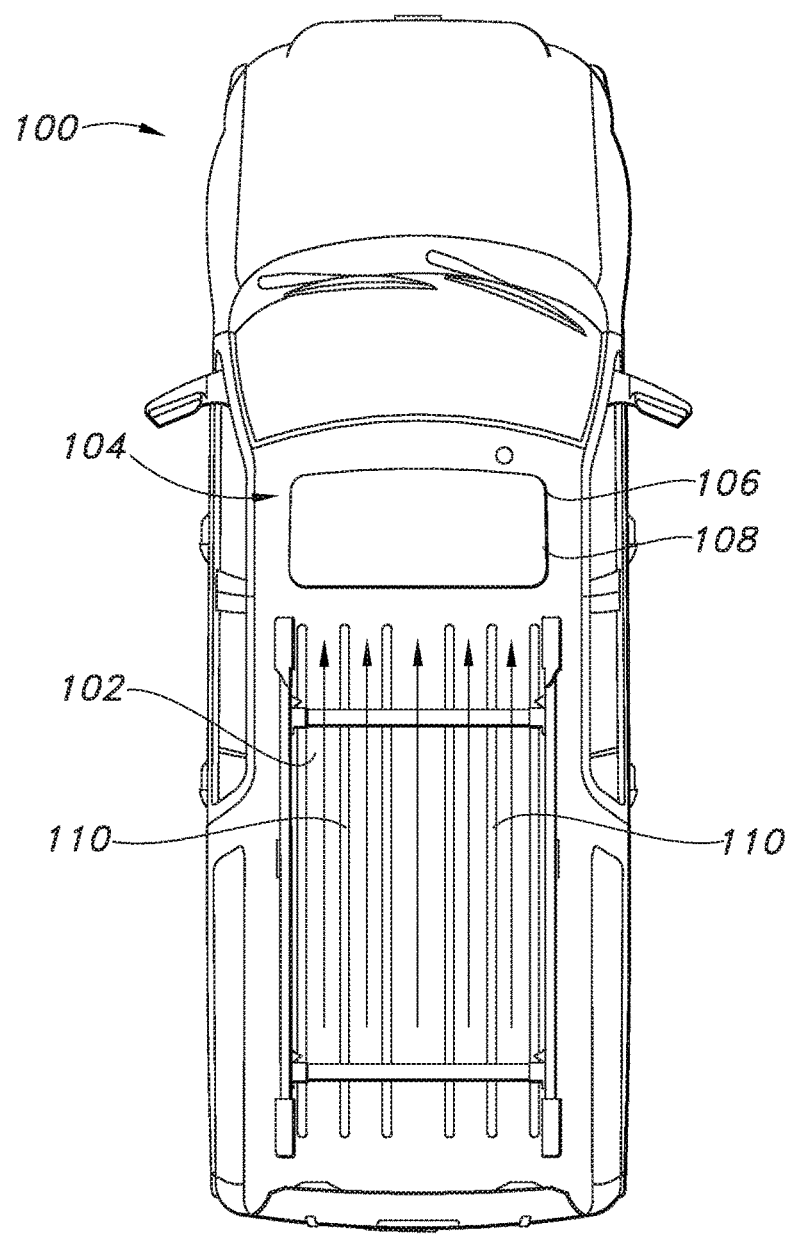
FIG. 1 shows a top view of a vehicle including a sun roof/moon roof assembly.

FIG. 1 illustrates a vehicle 100 including a roof panel 102 having a sun roof/moon roof assembly 104 disposed therein. The specific construction of a sun roof/moonroof assembly 104 is well-known in the art, and a complete description thereof is unnecessary herein. However, at a high level a sun roof/moonroof assembly 104 includes at least one translatable panel 106 which may be fabricated of glass, metal, or both. A manual or more typically a motorized mechanism (not shown) is provided for opening/closing the sun roof/moonroof assembly. The translatable panel 106 is dimensioned to occlude a roof panel aperture 108, whereby in conjunction with a seal assembly (not shown), intrusion of water into the vehicle 100 passenger cabin is prevented when the sun roof/moonroof assembly 104 is placed in a closed configuration. The vehicle roof panel 102 may include a plurality of grooves or channels 110 defined therein, for the purposes described above.

Figure 2A:
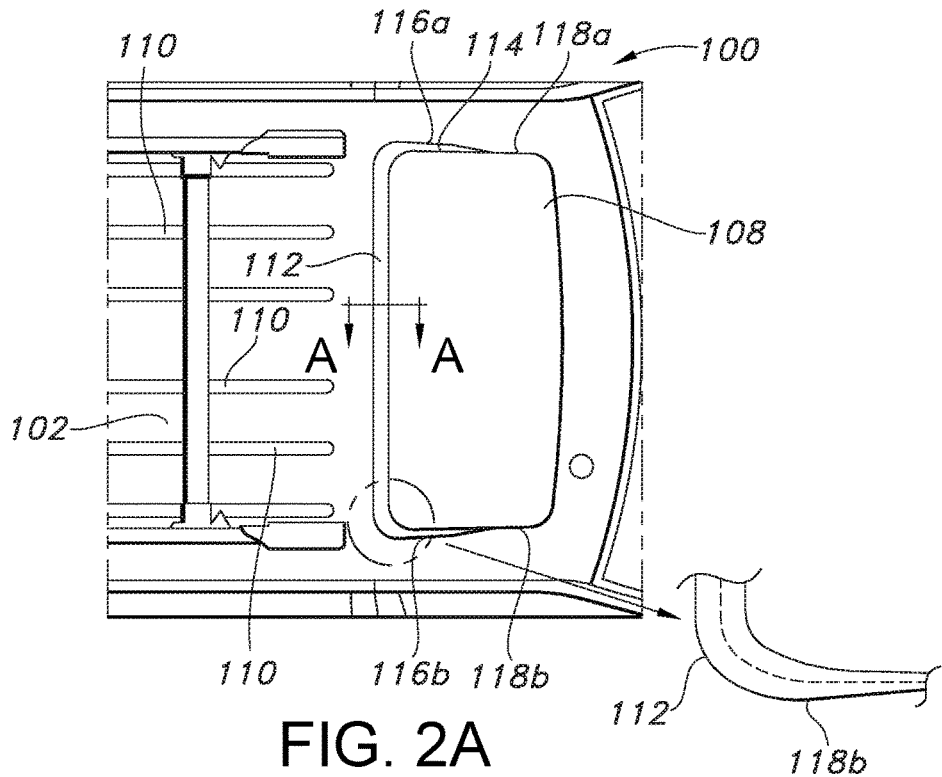
FIG. 2A shows the sun roof/moon roof assembly of FIG. 1, outfitted with an embodiment of a water diverter according to the present disclosure.
Figure 2B:
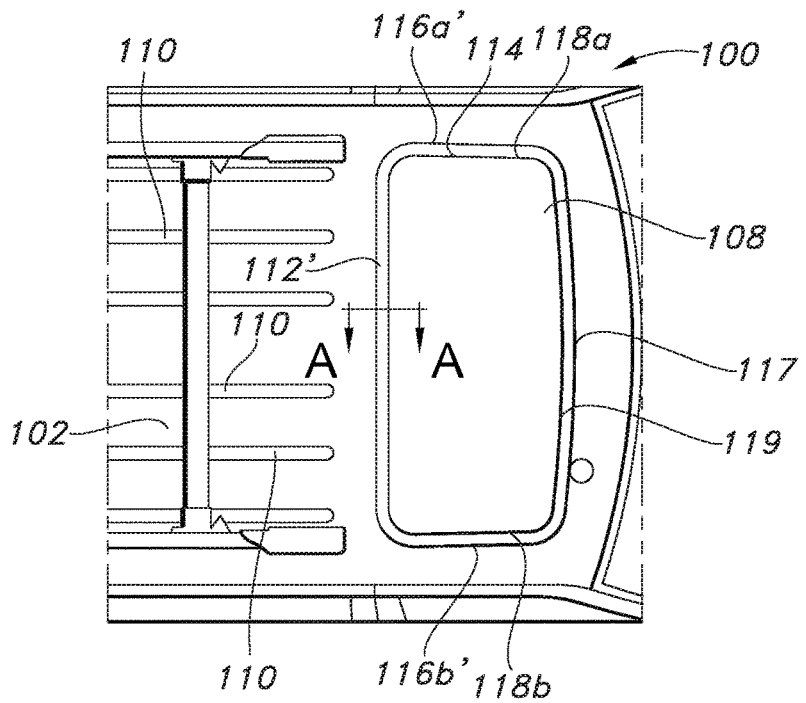
FIG. 2B shows the sun roof/moon roof assembly of FIG. 1, outfitted with an alternative embodiment of a water diverter according to the present disclosure.

To avoid the above-identified problems of intrusion of water that has collected on the vehicle roof panel 102 and/or in the grooves or channels 110 into an opened sunroof/moon roof assembly 104, with reference to FIGS. 2A-2B there is provided a water diverter 112 configured and dimensioned to follow at least a portion of a periphery of the roof panel aperture 108. In use, as shown the water diverter 112 is disposed on the vehicle roof panel 102 whereby water is diverted at least from a vehicle-rearward edge 114 of the roof panel aperture 108. The water diverter 112 further may include end portions 116a, 116b configured to match a curvature of the rear corners of the roof panel aperture 108, whereby water is also diverted from the vehicle-outboard edges 118a, 118b of the roof panel aperture. By the described structure, water collected on the roof panel 102 which is caused to flow towards the sun roof/moonroof assembly 104 by e.g. a braking action or vehicle nose-down orientation is diverted, and so is prevented from intruding into the vehicle 100 passenger cabin even when the sun roof/moonroof translatable panel 106 is in a fully or partially opened configuration.

FIG. 2B shows an alternative embodiment of a water diverter 112', configured and dimensioned to follow an entire periphery of the roof panel aperture 108. As shown, in use the water diverter 112' is disposed on the vehicle roof panel 102 whereby water is diverted from the vehicle-rearward edge 114 of the roof panel aperture 108. In turn, the water diverter 112' includes opposed edges 116a', 116b' which divert water from the vehicle-outboard edges 118a, 118b of the roof panel aperture 108. The water diverter 112' further includes a vehicle-forward portion 117 which diverts water from a vehicle-forward edge 119 of the roof panel aperture 108. By the described structure, water collected on the roof panel 102 which is caused to flow towards the sun roof/moonroof assembly 104 by e.g. a braking action or vehicle nose-down orientation is diverted, and so is prevented from intruding into the vehicle 100 passenger cabin even when the sun roof/moonroof translatable panel 106 is in a fully or partially opened configuration. Likewise, water which may have collected on a vehicle-forward portion of the roof panel 102 which is caused to flow toward the sun roof/moonroof assembly 104 by e.g. a sudden acceleration of the vehicle 100 is diverted and prevented from intruding into the vehicle passenger cabin even when the sun roof/moonroof translatable panel 106 is in a fully or partially opened configuration.

Figure 3:
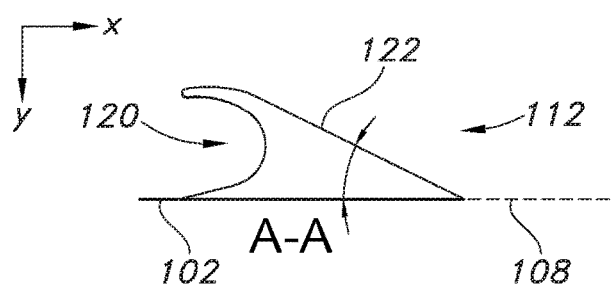
FIG. 3 shows a side cross-sectional view of the water diverter of FIG. 2.

FIG. 3 shows a side cross-sectional view of an embodiment of the water diverter 112. As shown, the water diverter 112 when installed on a vehicle 100 includes a roof panel aperture-outboard facing side 120 defining a water-diverting groove. In the depicted embodiment the vehicle-rearward facing side 120 defines an arcuate shape in cross-section. However, any suitable cross-sectional configuration for the vehicle-rearward facing side 120 is contemplated, such as square, rectangular, triangular, etc. as long as the water diverting function is suitably performed. As will be appreciated, water flowing towards the roof panel aperture 108 will be captured and diverted by the roof panel aperture-outboard facing side 120, thus preventing intrusion of the water into the vehicle 100 passenger cabin through an opened sun roof/moonroof translatable panel 106.

The water diverter 112 when installed on a vehicle 100 also includes a roof panel aperture-inboard facing side 122. The vehicle-forward facing side 122 may define any desired configuration. In the depicted embodiment, the vehicle-forward facing side 122 defines an included angle relative to a plane defined by the roof panel 102, whereby the vehicle-forward facing side presents a substantially aerodynamic surface. As will be appreciated, by this feature airflow passing over the vehicle roof panel 102 during vehicle 100 operation is smoothed, reducing NVH and potentially improving fuel efficiency.

Figure 4A:
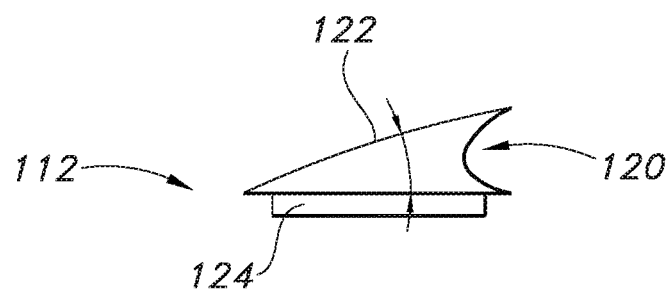
FIG. 4A shows an embodiment of a retaining structure for attaching the water diverter of FIG. 2 to a portion of a vehicle roof panel.
Figure 4B:
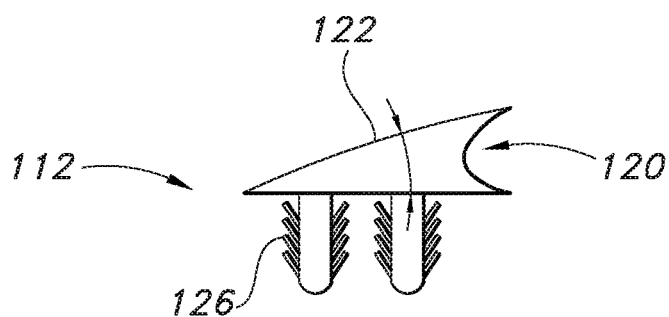
FIG. 4B shows an alternative embodiment of a retaining structure for attaching the water diverter of FIG. 2 to a portion of a vehicle roof panel.
Figure 4C:
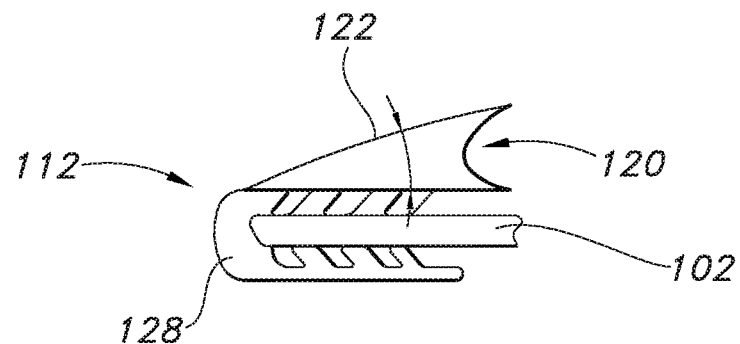
FIG. 4C shows another alternative embodiment of a retaining structure for attaching the water diverter of FIG. 2 to a portion of a vehicle roof panel.

A variety of attachment strategies for attaching the water diverter 112 to a vehicle roof panel 102 are contemplated. Of course, conventional fasteners such as screws, bolts/nuts, rivets, and the like could be used. In particular embodiments, with reference to FIGS. 4A-4C, it is contemplated to attach the water diverter 112 by a layer of adhesive 124 (FIG. 4A). Many suitable adhesives are known in the automotive and other arts, and are contemplated for use herein. It is also known in the art to use push pins/push-in rivets 126 to secure features such as trim pieces to vehicle 100 elements, and use of such structures is contemplated herein to attach the water diverter 112 to the roof panel 102 (see FIG. 4B). The push pins/push-in rivets 126 may be formed integrally to the water diverter 112, or may be provided as separate fastening elements. Still more, a friction fit/interference fit receiver 128 (FIG. 4C) may be provided, dimensioned to capture a portion of the roof panel 102 therein to secure the water diverter 112 to a portion of the roof panel 102 defining a periphery of the roof panel aperture 108. Still further, other suitable adhesive means may be used to fasten the water diverter 112 to the roof panel 102, for example a WAFT tape. Of course, such attachment strategies may be used individually and/or in various combinations, and all such strategies are contemplated herein.

As will be appreciated, by the described water diverter 112 a simple, economical, and robust device for preventing intrusion of collected water into an opened vehicle sun roof/moonroof assembly 104 is provided. The water diverter 112 can be provided as original manufacturer equipment. Equally, however, the water diverter 112 can be readily and conveniently provided as an aftermarket device. Still more, the described configuration of the water diverter 112 provides an additional aerodynamic surface which, when the vehicle 100 is operated, potentially may serve to reduce NVH and improve fuel efficiency.

Obvious modifications and variations are possible in light of the above teachings. All such modifications and variations are within the scope of the appended claims when interpreted in accordance with the breadth to which they are fairly, legally and equitably entitled.

What is claimed:

1. A device for preventing intrusion of collected water into a vehicle, comprising an upwardly projecting water diverter defining a roof panel aperture-outboard facing water-diverting groove configured and dimensioned to divert water from at least a vehicle-rearward edge of a roof panel aperture provided for a vehicle sun roof/moon roof assembly, and including end portions configured to divert water from at least a portion of opposed vehicle-outboard edges of the roof panel aperture;
   wherein the water diverter further includes a roof panel aperture-inboard facing aerodynamic surface.

2. The device of claim 1, wherein the water diverter is adapted for attaching to a portion of the vehicle roof panel adjacent to the roof panel aperture.

3. The device of claim 1, wherein the water diverter is adapted for attaching to the portion of the vehicle roof panel by one or more of an adhesive, one or more push pins, one or more push-in rivets, and a receiver adapted to engage an edge or a flange of the vehicle roof panel.

4. A sun roof/moonroof assembly including the device of claim 1.

5. A vehicle including the sun roof/moonroof assembly of claim 4.

6. A sun roof/moonroof assembly for a vehicle, comprising:
   a panel dimensioned to occlude a sun roof/moonroof aperture in a vehicle roof panel and adapted for translation between an open position and a closed position; and
   an upwardly projecting water diverter defining a roof panel aperture-outboard facing water-diverting groove configured and dimensioned to divert water from at least a vehicle-rearward edge of the sun roof/moonroof aperture, and including end portions configured to divert water from at least a portion of opposed vehicle-outboard edges of the sun roof/moonroof aperture;
   wherein the water diverter further includes a sun roof/moonroof aperture-inboard facing aerodynamic surface.

7. The sun roof/moonroof assembly of claim 6, wherein the water diverter is adapted for attaching to a portion of the vehicle roof panel adjacent to the sun roof/moonroof aperture.

8. The sun roof/moonroof assembly of claim 7, wherein the water diverter is adapted for attaching to the portion of the vehicle roof panel by one or more of an adhesive, one or more push pins, one or more push-in rivets, and a receiver adapted to engage an edge or a flange of the vehicle roof panel.

9. A vehicle including the sun roof/moonroof assembly of claim 6.

10. A vehicle, comprising:
    a roof panel defining a sun roof/moonroof aperture and one or grooves or channels;
    a sun roof/moonroof assembly comprising a panel dimensioned to occlude the sun roof/moonroof aperture and adapted for translation between an open position and a closed position; and
    an upwardly projecting water diverter defining a roof panel aperture-outboard facing water-diverting groove configured and dimensioned to divert water from at least a vehicle-rearward edge of the sun roof/moonroof aperture;
    the water diverter further including end portions configured to divert water from at least a portion of opposed vehicle-outboard edges of the sun roof/moonroof aperture and a sun roof/moonroof aperture-inboard facing aerodynamic surface.

11. The vehicle of claim 10, wherein the water diverter is adapted for attached to a portion of the vehicle roof panel by one or more of an adhesive, one or more push pins, one or more push-in rivets, and a receiver adapted to engage an edge or a flange of the vehicle roof panel.

* * * * *